Jan. 23, 1940.　　　C. R. WEISS　　　2,188,025
CORROSIVE RESISTANT CHAIN AND DRIVE
Filed March 28, 1938　　2 Sheets-Sheet 1
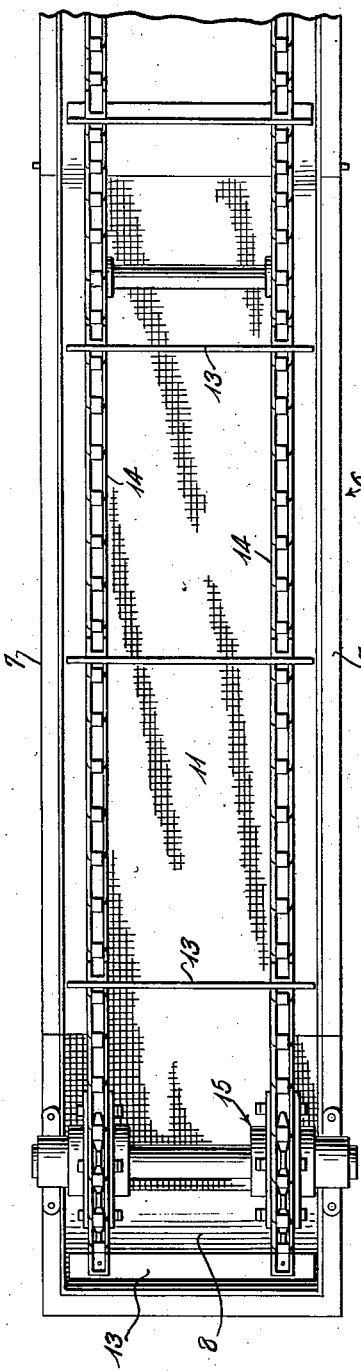
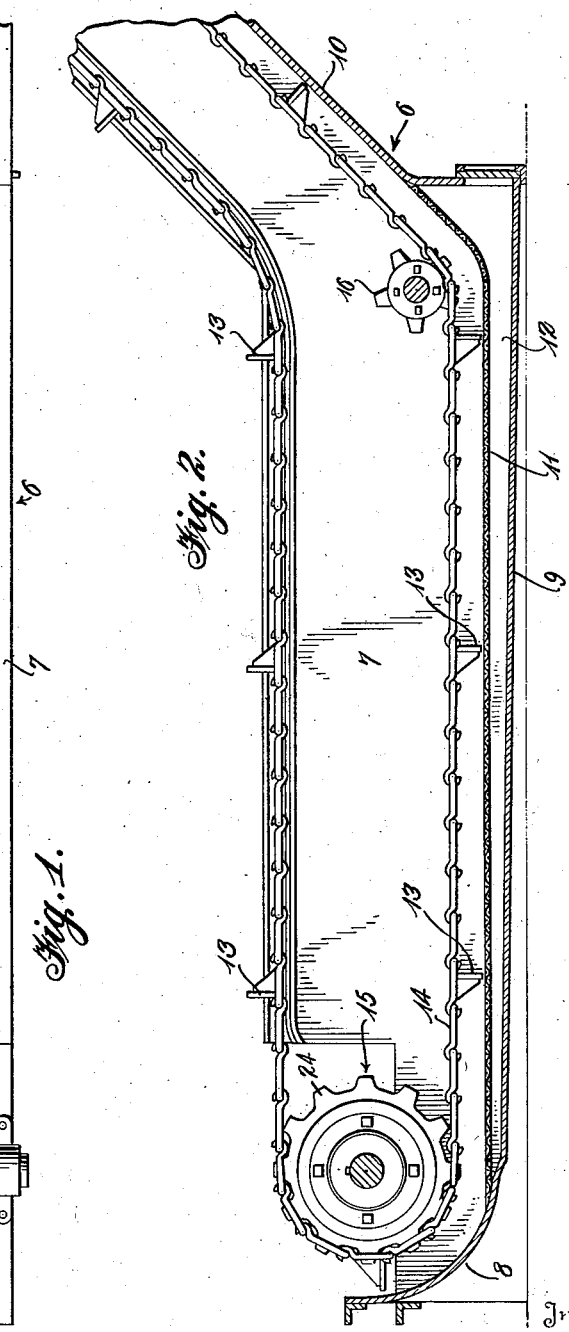
Inventor
Charles R. Weiss
By L. Donald Myers
Attorney Jan. 23, 1940.   C. R. WEISS   2,188,025
CORROSIVE RESISTANT CHAIN AND DRIVE
Filed March 28, 1938   2 Sheets—Sheet 2
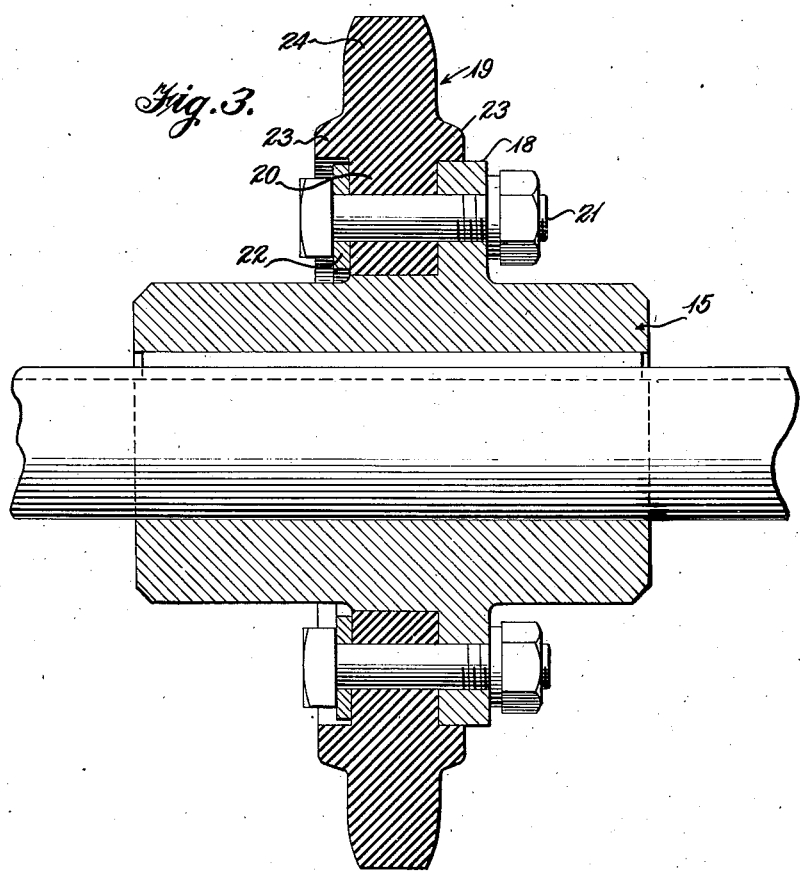
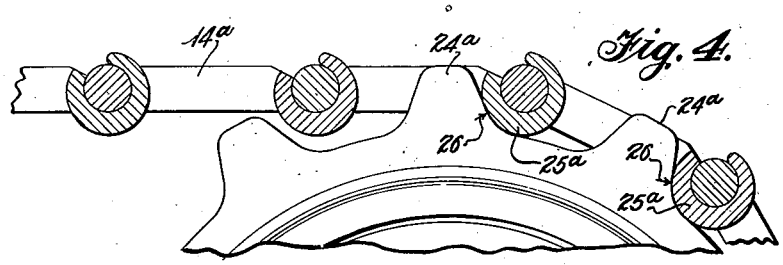
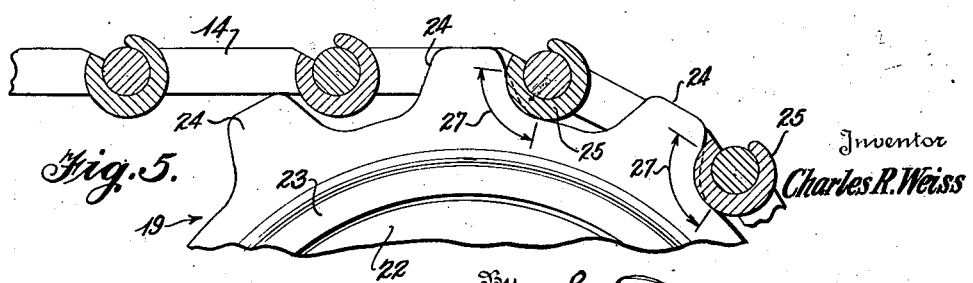
Inventor
Charles R. Weiss
By
Attorney Patented Jan. 23, 1940

2,188,025

UNITED STATES PATENT OFFICE 2,188,025

CORROSIVE RESISTANT CHAIN AND DRIVE

Charles R. Weiss, Indianapolis, Ind., assignor to Link-Belt Company, a corporation of Illinois Application March 28, 1938, Serial No. 198,550

4 Claims. (Cl. 198—203)

This invention relates to means for rendering and maintaining conveyor chains and like assemblies impervious to the action of corrosive and acidulous juices and fumes during prolonged periods of service of these assemblies in the presence of such destructive elements.

The operators of sugar mills, citrous packing plants, pineapple canneries, or most any plant or factory where fruit or vegetables are packed or otherwise handled, are confronted with the troublesome problem of maintaining at a reasonable cost conveyor or other chain assemblies which, under normal operating conditions, are subjected to corrosive attacks by acidulous juices or fumes. The problem is an extremely serious one when the chain assemblies operate in the presence of a macerated product and particularly when arranged in a submerged or partially submerged condition with respect thereto. The corrosive juices and fumes effect such rapid oxidation of the metal chain and sprocket parts of such assemblies that they must be replaced much more frequently than is necessary under operating conditions where wear is the principal cause of equipment destruction.

There are, of course, bronzes, stainless steels, and other alloys which are impervious to corrosives and from which the elements of chain assemblies might be made. The cost of such materials, however, prohibits their use in most instances for the chain assemblies, particularly in the case of conveyors, are of such sizes as to require the use of large quantities of such material in their manufacture.

It is well known that ordinary iron and steel may be rendered impervious to corrosive agents by coating or plating the surfaces of the same with comparatively inexpensive corrosive resistant materials. It thus would be expected that chain assemblies could be effectively protected against the deleterious action of acidulous agents by merely coating or plating the exposed surfaces of the same. This has proved not to be the case for such coated or plated chain assemblies fail to stand up in the presence of such agents.

Numerous attempts have been made by different chain manufacturers, and others interested in the problem, to develop an improved form of protective coating or surface which would resist corrosive agents when subjected to the operating conditions encountered by chain assemblies. So far such attempts have failed to develop a satisfactory protective material or coating method.

Starting with the premise that it is possible to render the surfaces of metallic objects impervious to the action of acidulous agents by coating or plating the same with numerous protective materials and that the ineffectiveness of this type of protection for the elements of chain assemblies must be due to the fact that the surfaces fail to remain intact or as produced under the operating conditions to which such assemblies are subjected, such chain assemblies have been carefully examined after different periods of use to determine the condition of their plated or coated surfaces and to ascertain, if possible, the cause of the failure of such protecting surfaces or envelopes.

It was definitely determined that after but a few hours of operation, the protecting covering for the mating or meshing surfaces of the chain links and sprocket teeth had been affected or modified to such an extent that it was possible to deeply pit these members by subjecting the same to the action of an etching bath. It was obvious, therefore, that the protective envelope or coating had been broken. It was further determined that when soft coated or plated surfaces were provided, it appeared that the protective coating had been scrubbed or worn off the areas subjected to the greatest amount of wear and that when hard coated or plated surfaces were employed, the protective envelope had been shattered and numerous fine cracks had developed therein. Of course, as soon as the continuity of the covering or coating was broken at any point, the corrosive agents will be allowed to attack the core material and destruction starts. From these observations, it was presumed that the breaking down of the protective envelope was caused by the metal-to-metal contact which occurs between the cooperating chain and sprocket parts.

The scrubbing or wearing away of the soft coating material unquestionably resulted from friction developed during operation of the assemblies. It was decided that shattering or cracking of the hard surface coating resulted from impact blows delivered at the time of meshing of the chain and sprocket elements and from the instantaneous flattening or changing of contour of the cooperating chain and sprocket parts which is brought about by concentration of the entire load at the point or line of contact between these metal parts. It is known that the load thus concentrated is of such an amount as to stress the material beyond the point of elasticity or yield so that permanent injury results and numerous surface cracks are formed in the protective coating.

It is the primary object of this invention to provide methods and means for rendering chain assemblies impervious to the action of corrosive agents over prolonged periods of use by preventing the protective coatings or envelopes from being scrubbed or worn away or shattered by impact blows and the result of load concentration on points or lines of contact.

A further important object of the invention is to provide means for training and driving chains which are coated, plated, or surface impregnated with corrosive resistant materials in a manner to prevent destruction of the protective envelope.

Still another object of the invention is to provide a form of sprocket construction which will cooperate with plated or coated chains in a manner to absorb and lessen impact blows and to so distribute the load as to effect minimization of unit load bearing pressures and stresses per unit area whereby shattering or cracking of the protective envelope from such causes will not occur.

Other objects and advantages of the invention will be apparent during the course of the following description.

In the accompanying drawings forming a part of this specification and in which like numerals are employed to designate like parts throughout the same, Figure 1 is a partial top plan view of a form of conveyor chain assembly which illustrates and embodies this invention, Figure 2 is a longitudinal vertical sectional view of the assembly disclosed in Fig. 1.

Figure 3 is a transverse sectional view of a novel form of sprocket wheel embodying this invention, Figure 4 is a detail view, partly in elevation and partly in section, illustrating the type of contact which occurs between the teeth of a metal sprocket and a conventional form of metal chain, and Figure 5 is a similar view to Fig. 4, but illustrates the type of contact which occurs between the respective link members of a coated or plated chain and the teeth of a sprocket wheel which is formed of a suitable resilient, deformable or yieldable material, such as molded rubber.

As has been indicated above, this invention relates to chain assemblies which are particularly adapted for use as a part of or in connection with machines and apparatus used in all kinds of plants, canneries, or the like, where fruits and vegetables are handled and where the chain assemblies are subjected to acidulous juices and fumes. It would be impossible, or at least impractical, to attempt to illustrate or even mention all of the different types of machines and devices which are used in plants, canneries, or the like, of the above mentioned character, where chain assemblies are employed which are subjected to the action of corrosive agents. As a typical example of this type of apparatus, there has been illustrated in Figs. 1 and 2, a portion of a juice strainer and trash elevator which is employed as a part of a cane mill.

Persons familiar with the operation of cane mills are acquainted with the fact that the sugar cane is passed through various sets of rollers or mills which are employed for macerating or crushing the cane. The action of these sets of rolls or mills results in expressing from the cane a certain amount of juice with which is mixed a certain percentage of trash or pulp. This aggregate of juice and trash or pulp is accumulated or collected in a system of troughs, or the like, and is conveyed to the juice strainer and trash elevator unit of the entire apparatus. This unit functions to move or pass the trash and pulp over a straining screen or plate through which the juice passes and is thereby separated from the trash. The unit conveys the trash and pulp away from the screen and returns it to the sets of rollers or mills through which it is again passed for the purpose of extracting any remaining juice.

It is obvious that in such a juice strainer and trash elevator unit, the chain assembly of the conveyor portion of the unit is operating in at least a partially submerged condition with respect to the mass of sugar cane juice and its trash or pulp. The chain assembly, therefore, is directly subjected to the corrosive action of this acidulous juice.

These acidulous juices so strenuously attack the parts of an ordinary chain assembly that destruction of the assembly occurs in a comparatively short length of time. Even chain assemblies which have their various parts or elements protected by a corrosive resistant coating will not withstand the attack of the corrosive juices for a sufficiently greater length of time than ordinary assemblies to make their life of service satisfactory and economically practical. As has been explained above, this is due to the fact that the metal-to-metal contact which occurs between the sprocket wheels and the chain links breaks down the protective coating or plating and permits the corrosive juices and fumes to attack the base or core metals of the various parts.

For the benefit of those who are not familiar with juice strainer and trash elevators for cane mills, the structure disclosed in Figs. 1 and 2 now will be described. This unit includes a frame, designated in its entirety by the reference character 6, which includes the side walls 7, the curved lower end wall 8, and the bottom wall sections 9 and 10. Stretched over the bottom wall section 9 is a straining screen or perforated plate 11 through which the juices pass to be accumulated in the bottom chamber 12. The collected juice may be drawn off in any desired manner.

The aggregate of sugar cane juice and trash or pulp is delivered to the portion of the frame 6 with which the bottom wall section 9 is associated. This aggregate is usually discharged through the open top defined by the side walls 7. To cause or permit the juice to separate from the trash or pulp and pass through the strainer 11, it is moved over the top surface of this strainer by means of the flights or cross slats 13 which are carried by the parallel, endless chains 14. These chains 14 travel around suitably arranged end sprocket wheels 15 and training or bend defining sprockets 16.

Until the development of this invention, the chains 14 of assemblies represented by the apparatus disclosed in Figs. 1 and 2 have been formed of either plain or coated link parts and the sprocket wheels have been formed of metal. The sprocket wheels which are illustrated in these two figures and the sprocket chains have been compelled to operate at least in a partly submerged condition with respect to the sugar cane juices and trash. The bottom runs of the chains, even after they leave the surface of the strainer 11, pass upwardly along the inclined bottom wall section 10 in the presence of thoroughly wetted trash which is being elevated to a higher level for being returned to the sets of rollers or mills, as explained heretofore. The return runs of the chains are exposed to the atmosphere as is clearly indicated. It will be appreciated, therefore, that the conditions under which this type of chain assembly operate are ideal for oxidation of the various parts of the assembly.

It has been discovered that if the metal-to-metal contact between the chain parts and the sprocket wheels be dispensed with, corrosion of the chains can be successfully prevented by covering or plating the chain parts with a corrosive resistant material. The elimination of this metal-to-metal contact has been brought about by forming the sprocket wheels, or at least the chain engaging portions of the sprocket wheels from molded natural or synthetic rubber, or any other resilient, deformable or yieldable material of a corrosive resistant character. The resilient or yieldable portion or part of each sprocket, naturally, has formed therein the teeth which mesh with the chain links. It is essential that the sprocket wheels be made of the selected yielding material to a sufficient extent to prevent any portions of the chain links from contacting with metal parts of the sprockets. It is essential that the flank, root and side faces of the sprocket teeth be formed of the yielding material as these are the surfaces of the teeth which are engaged by chain link parts. It, also, is essential that the sprocket teeth be constructed of the yieldable material in a manner which will permit the teeth to yield when the load is applied thereto by the chain barrels so that the load may be absorbed by several teeth.

One form of sprocket wheel which has been found to be very satisfactory is illustrated as being applied to the apparatus disclosed in Figs. 1 and 2, and is shown in detail in Figs. 3 and 5. This sprocket wheel consists of a hub 17 which is formed with a peripheral, upstanding flange 18. A toothed ring 19 is detachably connected to this upstanding flange 18. This toothed ring includes a web portion 20 which is secured to the flange 18 by a plurality of bolts and their associated nuts 21. The side of the web 20 which is opposite the hub flange 18 is backed and reinforced by a metallic ring 22. Suitable bracing flanges 23 are formed on the opposite sides of the ring 19 and cooperate with the peripheries of the hub flange 18 and the ring 22, in the manner best illustrated in Fig. 3. The teeth 24 are molded or machined into the peripheral portion of the ring 19. As has been stated, this ring may be molded or in any other suitable way formed from natural or synthetic rubber or any other corrosive resistant, resilient, deformable, yieldable material.

Fig. 4 discloses the links of a chain 14a which are meshing with the teeth 24a of a sprocket wheel which is made entirely of metal. The barrel portions 25a of the chain 14a are illustrated as having point or line contacts with the flanks of the teeth 24a. This point or line contact is represented by the arrows 26. This point or line type of contact occurs in all entirely metallic forms of chains and sprockets unless the sprocket teeth are formed with special flank surfaces which compensate for or modify the contact action which takes place between the chain link barrels and the sprocket teeth.

Where a point or line contact occurs, it is apparent that the load resulting therefrom is of an infinite amount at the instant of contact. This extremely high concentration of load produces an instantaneous change in the contour of or a flattening of both the cooperating chain link barrel and the sprocket tooth. The load is concentrated to such an extent and the value of the same is so great that the chain and sprocket parts are stressed beyond the point of elasticity or yield, with the result that these parts are permanently damaged. This disrupting of the parts, as a result of load concentration, results in cracking or shattering any covering or plating which may be provided on the surfaces of the chain links. This shattering or cracking of the protective envelope naturally permits acidulous juices or fumes to penetrate through the protective envelope to the core material. The impact resulting from engagement of the various metallic surfaces of the sprocket teeth with the coated or plated surfaces of the chain link parts also results in cracking or shattering the protective envelope provided on the chain parts.

Figure 5 illustrates the type of engagement or contact which occurs between the barrels 25 and the sprocket teeth 24 which are formed of rubber or other suitable yieldable material. The flanks of the teeth are illustrated as having been deformed sufficiently to provide an area of contact which is represented by the curved, double arrow line 27. The dotted lines extending through the barrels 25 indicate the normal contours of the tooth flanks. It will be appreciated that the yieldable teeth 24 of Fig. 5 will make possible such a distribution of the load over several teeth and over such areas of these several teeth as to effect minimization of unit load bearing pressures and stresses per unit area to such an extent as to prevent shattering or cracking of a protective coating or envelope due to any load concentration. The formation of the teeth 24 of rubber or any other suitable, yieldable material absorbs or lessens impact resulting from engagement of the chain and sprocket parts to such an extent that the protective coating is not shattered or cracked by the same.

As has been indicated above, soft plated or coated surfaces are scrubbed or worn away as a result of friction developed during metal-to-metal contact of chains with sprocket teeth. Forming the sprocket teeth of rubber, or other suitable, yieldable material and wetting the surfaces of these yieldable teeth with the juices of fruits and vegetables handled by the apparatus, lubricates the tooth surfaces to such an extent that ingress and egress of the sprocket teeth relative to the chain links may take place with a materially reduced co-efficient of friction and will result in preserving the coated or plated surfaces against any damaging scrubbing or wearing action.

Figures 1, 2, 4 and 5 illustrate a well known form of cast chain link. It is to be understood, however, that the application of this invention is not limited in any respect by this illustration for any type of plated or coated chain may be employed with the yieldable sprocket teeth. The expressions "corrosive resistant covering" and "corrosive resistant envelope," where used in the claims, are intended to include and cover all hard or soft coated, plated, impregnated or alloyed corrosive resistant surfaces.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. A chain assembly comprising a chain having the exposed surfaces of its links covered with a corrosive resistant envelope, and sprockets for training the chain having toothed chain engaging rings formed of molded rubber, or the like, whereby the assembly may be operated over prolonged periods of use in the presence of corrosive agents without being attacked thereby.

2. A conveyor assembly comprising a frame having a walled space constructed and arranged to confine vegetable and fruit solids and juices, a plurality of sprocket members mounted in said frame, said sprockets each including a toothed ring formed of molded rubber, or the like, and an endless conveyor including one or more chains trained over said sprockets to move said solids through said walled space, said chain or chains having links provided with corrosive resistant covering.

3. A chain assembly comprising a sprocket wheel having a metallic hub portion formed with a circumferential flange and a toothed ring having a web portion detachably secured to the hub flange with its teeth positioned entirely radially outwardly of said flange, said toothed ring being formed of molded rubber, or the like, to permit the flanks of the teeth to yield circumferentially of the ring under application of load thereto by meshing chain parts to effect distribution of the load over a considerable area of the flanks of several teeth, and a metallic chain meshing with the teeth of said sprocket and having the exposed surfaces of each link protected by a corrosive resistant covering.

4. A chain assembly comprising a sprocket wheel having a metallic hub portion and a toothed ring detachably secured to said hub portion, said toothed ring being formed of molded rubber, or the like, to permit the flanks of the teeth to yield circumferentially of the ring under application of load thereto by meshing chain parts to effect distribution of the load over a considerable area of the flanks of several teeth, and a metallic chain meshing with the teeth of said sprocket and having the exposed surfaces of each link protected by a corrosive resistant covering.

CHARLES R. WEISS.